(12) United States Patent
Ackermann et al.

(10) Patent No.: US 8,887,780 B2
(45) Date of Patent: Nov. 18, 2014

(54) PNEUMATIC VEHICLE TIRE

(75) Inventors: Lutz Ackermann, Mueden (DE);
Volkmar Fries, Bad Eilsen (DE);
Wolfgang Milchers, Sehnde (DE)

(73) Assignee: Continental Reifen Deutschland GmbH, Hannover (DE)

( * ) Notice: Subject to any disclaimer, the term of this patent is extended or adjusted under 35 U.S.C. 154(b) by 71 days.

(21) Appl. No.: 13/225,588

(22) Filed: Sep. 6, 2011

(65) Prior Publication Data
US 2012/0024444 A1 Feb. 2, 2012

Related U.S. Application Data

(63) Continuation of application No. PCT/EP2009/064953, filed on Nov. 11, 2009.

(30) Foreign Application Priority Data

Mar. 4, 2009 (DE) .......................... 10 2009 003 562

(51) Int. Cl.
*B60C 11/13* (2006.01)
*B60C 11/04* (2006.01)
(52) U.S. Cl.
CPC ............. *B60C 11/13* (2013.01); *B60C 11/1323* (2013.04); *B60C 2200/06* (2013.04); *B60C 11/042* (2013.04)
USPC ................................................... 152/209.18
(58) Field of Classification Search
USPC ................. 152/209.8, 209.9, 209.18, 209.21, 152/209.22, 209.24
See application file for complete search history.

(56) References Cited

U.S. PATENT DOCUMENTS

| | | | | |
|---|---|---|---|---|
| 3,584,670 A | * | 6/1971 | Verdier | ........................ 152/902 |
| 4,345,632 A | * | 8/1982 | Takigawa et al. | ........ 152/209.26 |
| 4,865,099 A | * | 9/1989 | Goergen | .................. 152/209.21 |
| 5,355,922 A | * | 10/1994 | Kogure et al. | ........... 152/209.18 |
| 5,803,999 A | * | 9/1998 | Shibata | .................... 152/209.14 |
| 7,669,624 B2 | | 3/2010 | Yagita | |

(Continued)

FOREIGN PATENT DOCUMENTS

| DE | 36 19 149 A1 | | 12/1987 |
|---|---|---|---|
| DE | 10311430 A1 | * | 9/2004 |

(Continued)

OTHER PUBLICATIONS

Machine translation for German 102007026653 (no date).*

(Continued)

*Primary Examiner* — Steven D Maki
(74) *Attorney, Agent, or Firm* — Laurence A. Greenberg; Werner H. Stemer; Ralph E. Locher

(57) ABSTRACT

A pneumatic vehicle tire, in particular for heavy commercial trucks, having a tread with a number of circumferential grooves which run in the circumferential direction and which separate profile positives, such as block rows or profile ribs, from one another. The circumferential grooves are each bounded by a groove base and two groove edges. In order to effectively prevent the occurrence of tears at the groove base of the circumferential grooves, in particular at the groove base of the circumferential grooves which extend on the shoulder side, the groove base extends, viewed in cross section and in the axial direction, at an angle of inclination of 3 degrees to 15 degrees with respect to an envelope which encompasses the outer faces of the profile positives.

6 Claims, 1 Drawing Sheet

(56) References Cited

U.S. PATENT DOCUMENTS

| | | | |
|---|---|---|---|
| 2006/0011280 A1* | 1/2006 | Yagita | 152/209.24 |
| 2007/0251622 A1* | 11/2007 | Tomita | 152/209.24 |
| 2012/0042998 A1* | 2/2012 | Ueda | 152/209.18 |
| 2012/0199258 A1* | 8/2012 | Clayton et al. | 152/209.18 |

FOREIGN PATENT DOCUMENTS

| | | | |
|---|---|---|---|
| DE | 10 2007 026 653 A1 | | 12/2008 |
| DE | 102007026653 A1 | * | 12/2008 |
| EP | 738616 A1 | * | 10/1996 |
| EP | 778162 A1 | * | 6/1997 |
| EP | 1 619 049 A1 | | 1/2006 |
| JP | 03-099903 A | * | 4/1991 |
| JP | 03-125607 A | * | 4/1991 |
| JP | 08-300909 A | * | 11/1996 |
| JP | 2004-210219 A | | 7/2004 |

OTHER PUBLICATIONS

Machine translation for Japan 08-300909 (no date).*
Machine translation for German 10311430 (no date).*
Machine translation for Europe 738616 (no date).*
International Search Report of PCT/EP2009/064953, Dated Dec. 28, 2009.

* cited by examiner

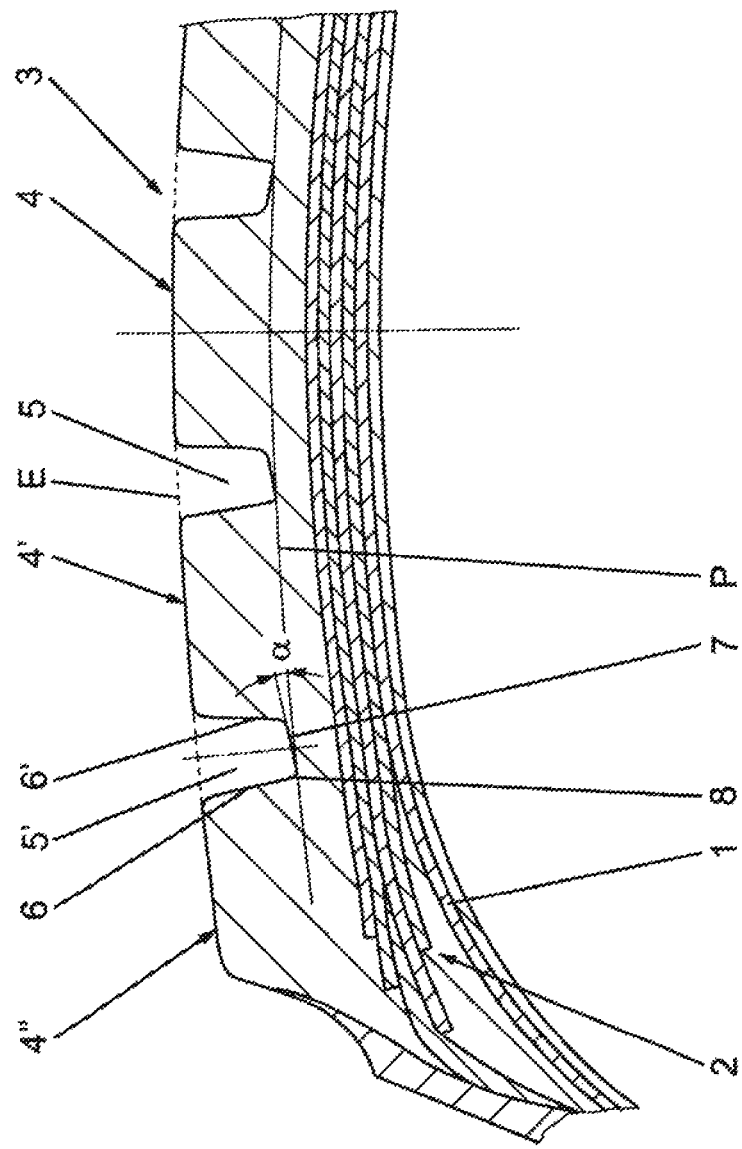

PNEUMATIC VEHICLE TIRE

CROSS-REFERENCE TO RELATED APPLICATION

This is a continuation application, under 35 U.S.C. §120, of copending international application No. PCT/EP2009/064953, filed Nov. 11, 2009, which designated the United States; this application also claims the priority, under 35 U.S.C. §119, of German patent application No. DE 10 2009 003 562.1, filed Mar. 4, 2009; the prior applications are herewith incorporated by reference in their entirety.

BACKGROUND OF THE INVENTION

Field of the Invention

The invention relates to a pneumatic vehicle tire, in particular for heavy trucks, comprising a tread rubber with a number of circumferential grooves running in the circumferential direction, which separate profile positives, such as rows of blocks or profile ribs, from one another. The circumferential grooves are respectively bounded by a groove base and two groove flanks.

It is known that the groove base of circumferential grooves in tread rubbers of heavy trucks, in particular of circumferential grooves that are adjacent the shoulder ribs or rows of shoulder blocks, tend to tear under high loading. To reduce the risk of tears forming, it is known for example to widen the belt plies, which however has an adverse effect on the durability of the breaker belt. It has also been proposed to introduce on the base of the groove special layers of rubber that have a lower tendency for tears to form. However, this measure can only be used with difficulty in the mass production of tires.

According to U.S. Pat. No. US 7,669,624 B2, its counterpart European Patent No. 1 619 049, and counterpart Japanese patent application JP 2004-210219, a special geometry of the circumferential grooves on the shoulder side is intended to avoid the formation of tears at the groove base. Those circumferential grooves are formed in cross section in such a way that the center of the innermost portion of the groove base is positioned closer to the equatorial plane of the tread rubber than the center defined by the groove width. In addition, the lateral groove flanks are formed in such a way that the angle between the surface of the tread rubber and the groove flank that is located on the side of the equatorial plane is equal to or less than the angle between the surface of the tread rubber and the opposite groove flank.

SUMMARY OF THE INVENTION

It is accordingly an object of the invention to provide a pneumatic vehicle tire which overcomes a variety of disadvantages of the heretofore-known devices and methods of this general type and which provides for a tire that effectively avoids the occurrence of tears at the groove base of the circumferential grooves, in particular at the groove base of the circumferential grooves running on the shoulder side, by way of a simple measure that does not require any special configuration of the groove flanks.

With the foregoing and other objects in view there is provided, in accordance with the invention, a pneumatic vehicle tire, in particular a tire for commercial trucks, the tire comprising:

a tread rubber formed with a plurality of profile positives and a plurality of circumferential grooves between and separating the profile positives from one another;

the profile positives, such as rows of tread blocks or tread profile ribs, having outer surfaces aligned along a tire tread envelope;

the circumferential grooves running in a circumferential direction of the vehicle tire and each being bounded by a groove base and two groove flanks;

the groove base, in cross section and in an axial direction, extending at an angle of inclination of 3° to 15° relative to the tire tread envelope encompassing the outer surfaces of the profile positives.

In other words, the objects are achieved according to the invention by the groove base, when considered in cross section and in the axial direction, running at an angle of inclination of 3° to 15° in relation to an envelope encompassing the outer surfaces of the profile positives.

The measure according to the invention results in a decrease in the loading at that region of the groove base which lies closer to the surface of the tread rubber, with respect to the radial direction, because of the inclination. The reduction in the loading is accompanied by a significant decrease in the susceptibility to tearing in this region of the groove base of the circumferential groove.

In the case of the customary tread rubbers of tires for heavy trucks, made up of profile ribs, it is advantageous if, in each half of the tread rubber, the groove base of the circumferential grooves falls away in the direction of the shoulders of the tire. Therefore, especially those regions of the groove base that are situated on the inside of the tread rubber and are particularly susceptible to tearing are effectively relieved of loading.

Depending on the configuration of the groove flanks, in particular depending on the size of the flank angles, it may be of advantage to incline the groove base in the circumferential grooves in such a way that it is raised on the outside of the tire, so that, in each half of the tread rubber, the groove base in the circumferential grooves falls away in the direction towards the centerline of the tread rubber.

In the case of tires with circumferential grooves in the tread rubber that have a varying inclination of the groove flanks over the circumference of the tire, or some other form or configuration that changes over the circumference of the tire, it may be of advantage if the inclination of the groove base is varied over the circumference of the circumferential groove, at least in certain portions of the circumferential groove.

Other features which are considered as characteristic for the invention are set forth in the appended claims.

Although the invention is illustrated and described herein as embodied in a pneumatic vehicle tire, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The single FIGURE of the drawing is a partial cross section through a pneumatic vehicle tire in the region of the tread rubber, illustrating an exemplary embodiment of the invention.

DETAILED DESCRIPTION OF THE INVENTION

Referring now to the FIGURE of the drawing in detail, there is shown a tread rubber 3 of a truck tire with the components located radially within the tread rubber, a radial carcass 1 and a breaker belt assembly 2. The radial carcass 1 may, in a conventional way, have a single-ply or multi-ply configuration and comprise steel cord as a reinforcing element. The breaker belt assembly 2 preferably has four belt plies, which may likewise be configured and arranged in a conventional way. The tread rubber 3 is made up of five profile ribs 4, 4' 4", of approximately equal width and running around in the circumferential direction. The profile rib 4 runs along the tire equator and the profile ribs 4" are the shoulder ribs. The profile ribs 4, 4', 4" may be replaced partly or entirely by rows of profile blocks. Wide circumferential grooves 5, 5', running around in the circumferential direction and they separate the profile ribs 4, 4', 4" from one another. The circumferential grooves 5, 5' may run over the circumference of the tire in an at least substantially straight line, but they may also follow a zigzag-shaped or zigzag-like path.

Each circumferential groove 5, 5' is bounded by two groove flanks 6, 6' and a groove base 7 joining the latter. In the case of circumferential grooves following a zigzag-shaped path, the groove flanks 6, 6', when considered in plan view of the tread rubber, are divided into portions which are inclined with respect to the circumferential direction of the tire. In the case of the basic variant shown in the FIGURE of the drawing, the two groove flanks 6, 6' are inclined with respect to the radial direction by a small acute angle of the order of magnitude of 3° to 15° in such a way that the groove width of the groove base 7 becomes greater toward the surface of the tread rubber. The groove flanks 6, 6' merge into the groove base 7 via transitional regions 8, which are rounded with a small radius of the order of magnitude of 1 mm to 3 mm. The groove base 7, of a planar configuration, is inclined in the axial direction in such a way that the axially inner groove flank 6' is shorter than the axially outer groove flank 6. If a line P parallel to a tire tread envelope E encompassing the outer surfaces of the profile ribs 4, 4' and 4" and indicated in the FIGURE by a broken line is placed in the axial direction at the point of the groove base 7 furthest inward in the radial direction, an angle of inclination a between the groove base 7 and the line P is between 3° and 15°.

In the case of the embodiment shown in the FIGURE, the groove base 7 is inclined at an angle a in all the circumferential grooves 5, 5', the inclination in each half of the tread rubber in each case being such that the groove base 7 of the circumferential grooves 5, 5' falls away to the outer side of the tread rubber. The inclination of the groove base according to the invention is especially advantageous in the circumferential groove 5' that is adjacent the shoulder rib 4", since the groove base 7 of this circumferential groove 5' is particularly susceptible to the occurrence of tears. In particular, that corner of the groove base that is on the inside of the tread rubber is particularly susceptible to tears. Computer simulations and load tests carried out in practice have shown that the inclination of the groove base 7 has the effect, as described, of significantly reducing the loading on the groove base 7 and thereby causing a marked reduction in the probability of the occurrence of tears.

The extent of the loading of the tread rubber on the groove base of circumferential grooves depends, inter alia, on the size of the tire and on how the profile is otherwise designed, in particular also on the configuration of the groove flanks, in particular the size of the flank angle. It may be advantageous to incline the groove base in such a way that it is raised on the outside of the tire. In particular in the case of tires with circumferential grooves which have a varying inclination of the groove flanks over the circumference of the tire, or other configurations that change over the circumference of the tire, it may be of advantage to vary the angle of inclination, in particular in certain portions of the circumferential extent of the circumferential grooves.

The invention claimed is:

1. A pneumatic vehicle tire, comprising:
   a tread rubber formed with a plurality of profile positives and a plurality of circumferential grooves between and separating said profile positives from one another;
   said profile positives having outer surfaces aligned along a tire tread envelope;
   said circumferential grooves running in a circumferential direction of the vehicle tire and each being bounded by a groove base and first and second groove flanks;
   said groove base, in cross section and in an axial direction, extending downwardly with a substantially constant inclination from said first groove flank to said second groove flank at an angle of inclination of 3° to 15° relative to said tire tread envelope encompassing said outer surfaces of said profile positives, with said first groove flank being shorter than said second groove flank.

2. The pneumatic vehicle tire according to claim 1, wherein said profile positives are rows of tread blocks or tread profile ribs.

3. The pneumatic vehicle tire according to claim 1, wherein said tread rubber has two halves and in each half of said tread rubber, said groove base of said circumferential grooves falls away in a direction towards a respective shoulder of the tire.

4. The pneumatic vehicle tire according to claim 1, wherein said tread rubber has two halves and in each half of said tread rubber, said groove base of said circumferential grooves falls away in a direction towards a center of said tread rubber.

5. The pneumatic vehicle tire according to claim 1, wherein said angle of inclination of said groove base is varied over the circumference of said circumferential groove, at least in certain portions of said circumferential groove.

6. The pneumatic vehicle tire according to claim 1, configured for heavy duty commercial trucks.

* * * * *